US012625581B1

(12) United States Patent
Chen

(10) Patent No.: US 12,625,581 B1
(45) Date of Patent: May 12, 2026

(54) OPTICAL NAVIGATION DEVICE AND CONTROL DEVICE USING THE OPTICAL NAVIGATION DEVICE

(71) Applicant: PixArt Imaging Inc., Hsin-Chu City (TW)

(72) Inventor: Ching-Shun Chen, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 19/012,895

(22) Filed: Jan. 8, 2025

(51) Int. Cl.
*G06F 3/042* (2006.01)
*G06F 3/041* (2006.01)
(52) U.S. Cl.
CPC ............ *G06F 3/0418* (2013.01); *G06F 3/042* (2013.01); *G06F 2203/04108* (2013.01)
(58) Field of Classification Search
CPC ................... G06F 3/0418; G06F 3/042; G06F 2203/04108
See application file for complete search history.

(56) References Cited

U.S. PATENT DOCUMENTS

2006/0274042 A1* 12/2006 Krah .................... G06F 3/03543
345/163
2011/0122060 A1* 5/2011 Westerweck ........ G06F 3/03543
345/156
2014/0306894 A1* 10/2014 Lee ...................... G06F 3/03543
345/166

* cited by examiner

*Primary Examiner* — Afroza Chowdhury
(74) *Attorney, Agent, or Firm* — Winston Hsu

(57) ABSTRACT

A control device comprising a processing circuit and an optical navigation device is disclosed. The optical navigation device comprises: a circuit board; an optical touch sensor, provided to the circuit board, configured to generate a touch sensing result; and a movement detecting device, configured to detect a movement of the optical touch sensor. The processing circuit generates a control signal according to the touch sensing result and the movement. The movement detecting device may be a proximity sensor and the circuit board may be a FPC.

18 Claims, 7 Drawing Sheets

OPTICAL NAVIGATION DEVICE AND CONTROL DEVICE USING THE OPTICAL NAVIGATION DEVICE

BACKGROUND OF THE INVENTION

1. Field of the Invention

The present invention relates to an optical navigation device and a control device using the optical navigation device, and particularly relates to an optical navigation device which can avoid false triggering of the optical navigation device, and a control device using the optical navigation device.

2. Description of the Prior Art

With the advancement of technology, optical navigation devices such as OFN (optical finger navigation) devices are becoming more and more popular. The user can use a control object such as a finger or a stylus to input instructions to the optical navigation device. However, the structure of conventional optical navigation devices makes it possible to have false triggering. For example, if the user lightly brushes against the optical navigation device while walking, or a certain part of the body is close to the optical navigation device, such actions may make false triggering of the optical navigation device, causing it to perform incorrect actions. However, conventional optical navigation devices usually have no mechanism to avoid false triggering.

SUMMARY OF THE INVENTION

One objective of the present invention is to provide an optical navigation device which can avoid false triggering.

One objective of the present invention is to provide a control device which can avoid false triggering.

One embodiment of the present application provides an optical navigation device, which comprises: a circuit board; an optical touch sensor, provided to the circuit board; and a movement detecting device, configured to detect a movement of the optical touch sensor.

In one embodiment, the movement detecting device is a proximity sensor and the circuit board is a FPC.

Another embodiment of the present application provides a processing circuit and an optical navigation device. The optical navigation device comprises: a circuit board; an optical touch sensor, provided to the circuit board, configured to generate a touch sensing result; and a movement detecting device, configured to detect a movement of the optical touch sensor. The processing circuit generates a control signal according to the touch sensing result and the movement.

In one embodiment, the processing circuit does not generate the control signal or generates the control signal which controls a target function to be non-activated, if the touch sensing result indicates the optical touch sensor is touched but the movement is below a movement threshold. Besides, the processing circuit generates the control signal which controls the target function to be activated if the touch sensing result indicates the optical touch sensor is touched and the movement is above the movement threshold.

In one embodiment, the movement detecting device is a proximity sensor and the circuit board is a FPC.

Still another embodiment of the present invention discloses an optical navigation device, comprising: a circuit board; an optical touch sensor, provided to the circuit board;

and a proximity sensor, configured to detect an approaching of a target object, wherein the approaching is for determining whether the optical navigation is really touched.

In view of above-mentioned embodiment, the false triggering of the optical navigation device may be avoided, thereby the control device using the optical navigation device may be more accurate.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. The term "first", "second", "third" in following descriptions are only for the purpose of distinguishing different one elements, and do not mean the sequence of the elements. For example, a first device and a second device only mean these devices can have the same structure but are different devices.

Figure 1:
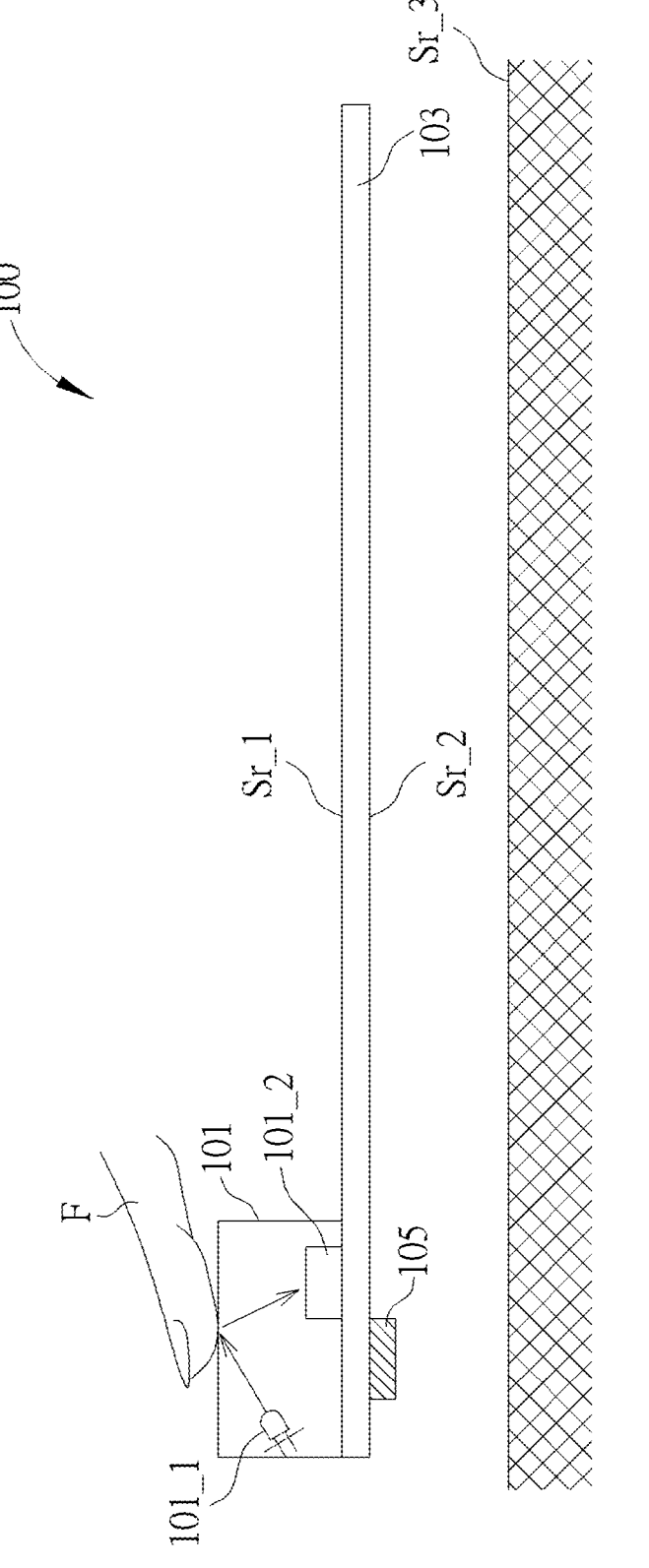
FIG. 1 is a schematic diagram illustrating an optical navigation device according to one embodiment of the present invention, in which a movement detecting device is comprised.
Figure 2:
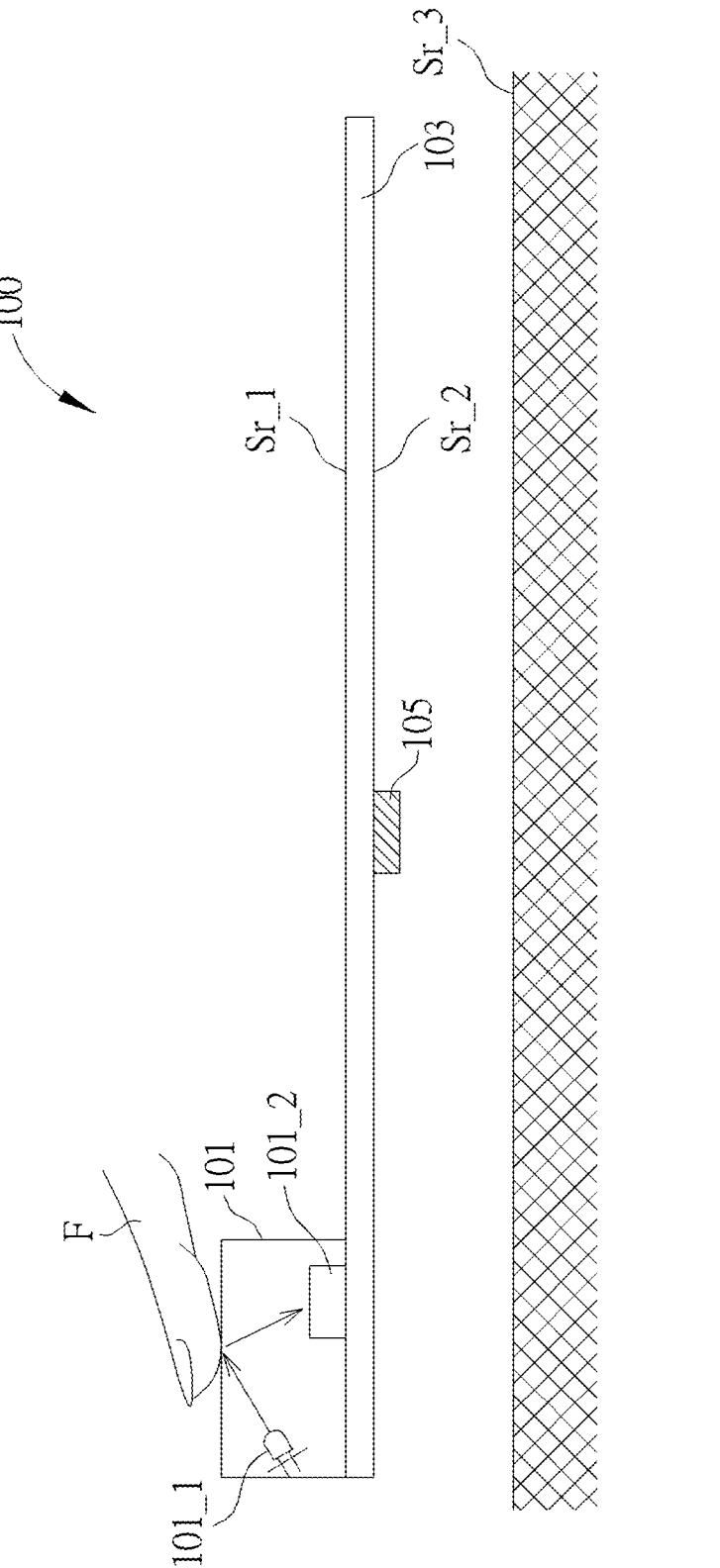
FIG. 2 is a schematic diagram illustrating an optical navigation device according to one embodiment of the present invention, in which a movement detecting device is comprised but the location of the movement detecting device is different from which in FIG. 1.

FIG. 1, FIG. 2, FIG. 3, FIG. 4, FIG. 5 and FIG. 6 are schematic diagrams illustrating optical navigation devices according to different embodiments of the present invention. As illustrated in FIG. 1, the optical navigation device 100 comprises an optical touch sensor 101, a circuit board 103 and a movement detecting device 105. The optical touch sensor 101 is provided to the circuit board 103.

The optical touch sensor 101 is configured to sense a touch event to generate a touch sensing result. The touch event can be provided by any control object such as the finger F illustrated in FIG. 1 or a stylus. In one embodiment, the optical touch sensor 101 comprises a light source 101_1 and an optical sensor 102_2. The light source 101_1 is configured to emit light L. Also, the optical sensor 102_2 is configured to sense optical data generated by the reflected light of the light L. In one embodiment, the optical data comprises images. Accordingly, the touch event provided by the control object may be determined according to the optical data. Please note, the numbers, the locations or the structures of the light source 101_1 and the image sensor 101_2 are not limited to the examples illustrated in FIG. 1.

The circuit board 103 may be any type of circuit board. In one embodiment, the circuit board 103 is a FPC (Flexible Printed Circuit Board), thus the optical navigation device 100 may be configured in various shapes. The movement detecting device 105 is configured to detect a movement of the optical touch sensor 101. In following embodiments, the movement detecting device 105 is a proximity sensor, which can detect an approaching of an object. Accordingly, if a user uses the control object to touch the optical navigation device 100 and provides a force to the optical touch sensor 101 to move it, the proximity sensor will detect the approaching of a target object, thereby the movement of the optical touch sensor 101 may be detected. The target object mentioned here may be different corresponding to the locations of the movement detecting device 105. However, the movement detecting device 105 can be any other device which can detect the movement of the optical touch sensor 101.

The movement detecting device 105 may be provided to various locations. In the embodiment of FIG. 1, the optical touch sensor 101 is provided to a first surface Sr_1 of the circuit board 103 and the movement detecting device 105 is provided to a second surface Sr_2 of the circuit board 103. The first surface Sr_1 and the second surface Sr_2 are opposite. In such embodiment, the movement detecting device 105 detects the approaching a surface Sr_3 (the above-mentioned target object) to detect the movement of the optical touch sensor 101. The surface Sr_3 may be a case of a device which contains the optical navigation device 100 or a surface of any other device inside the device containing the optical navigation device 100. In the embodiment of FIG. 1, the movement detecting device 105 is provided to the second surface SR_2 and outside the optical navigation device 100. However, the movement detecting device 105 may also be provided inside the circuit board 103.

The movement detecting device 105 may be provided to any other location of the optical navigation device 100. In FIG. 1, the movement detecting device 105 is provided to the second surface Sr_2, and is between the optical touch sensor 101 and the third surface Sr_3. In other words, the projected image on the third surface Sr_3 of the optical touch sensor 101 overlaps with the movement detecting device 105. However, in FIG. 2, the movement detecting device 105 is still provided to the second surface Sr_2, but is between the circuit board 103 and the third surface Sr_3, rather than between the optical touch sensor 101 and the third surface Sr_3. In other words, the projected image on the third surface Sr_3 of the optical touch sensor 101 does not overlap with the movement detecting device 105. In such embodiment, the movement detecting device 105 detects the approaching of the surface Sr_3 (the above-mentioned target object) to detect the movement of the optical touch sensor 101.

Figure 3:
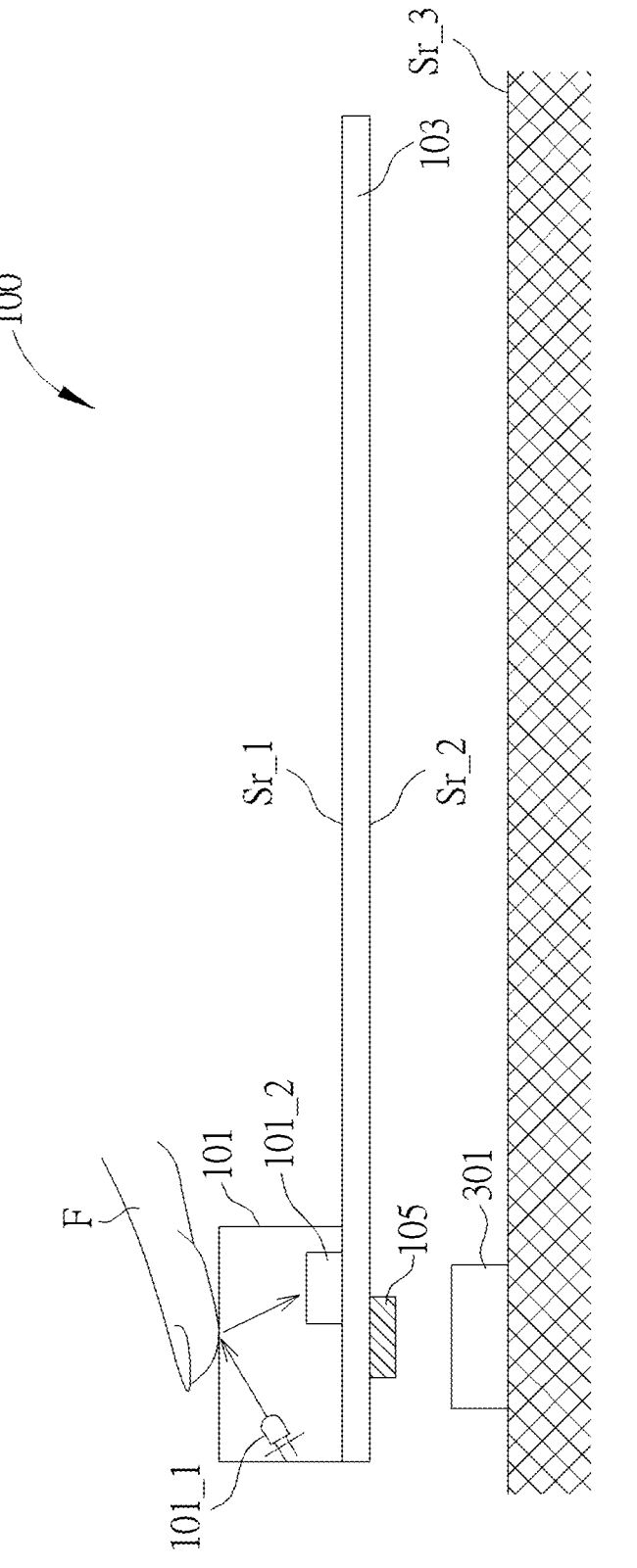
FIG. 3 is a schematic diagram illustrating an optical navigation device according to one embodiment of the present invention, in which the elastic material is further comprised besides the movement detecting device.

In the embodiment of FIG. 3, elastic material 301 such as elastic fibers is provided between the second surface Sr_2 and the third surface Sr_3. The elastic material 301 is configured to provide button press feeling, such that the user may feel a real button is pressed while pressing the optical touch sensor 101. In such example, the location of the movement detecting device 105 may be between the elastic material 301 and the second surface 301, as illustrated in FIG. 3. In such case, the movement detecting device 105 detects the approaching of the elastic material 301 (the above-mentioned target object) to detect the movement of the optical touch sensor 101.

Figure 4:
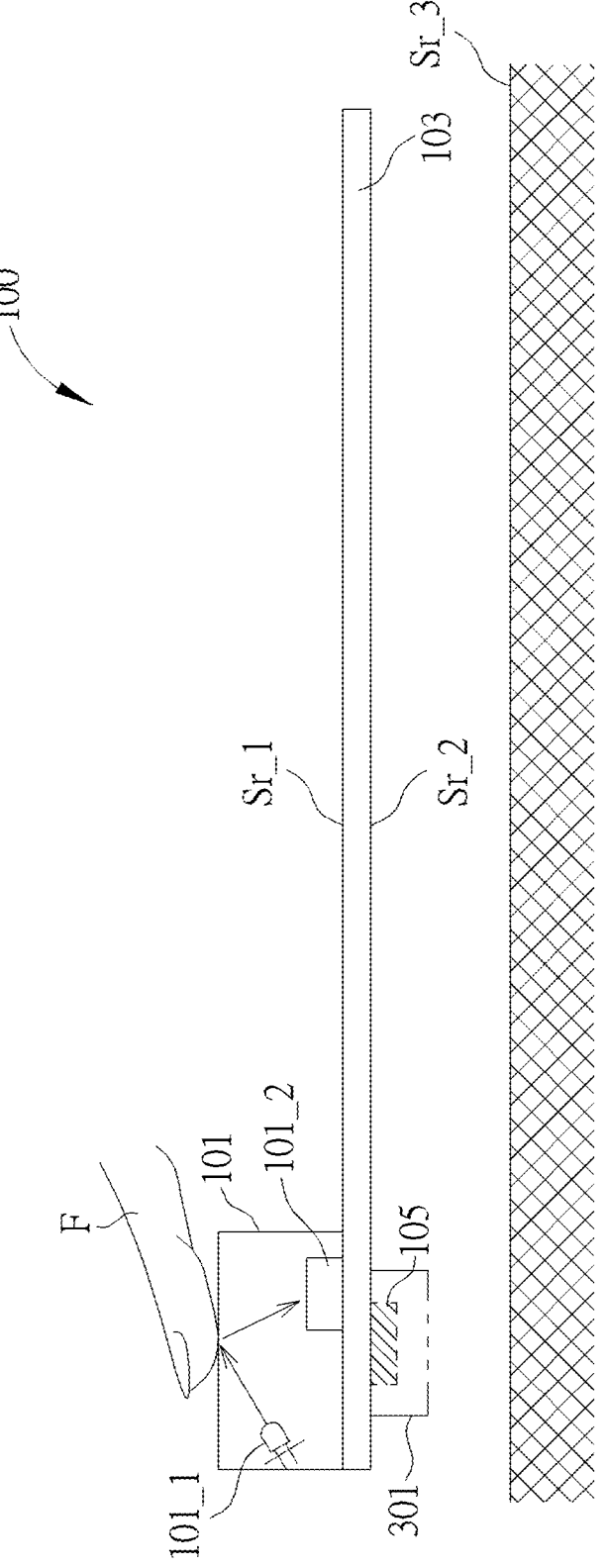
FIG. 4 is a schematic diagram illustrating an optical navigation device according to one embodiment of the present invention, in which the movement detecting device is surrounded by the elastic material.

The movement detecting device 105 may also be provided to another location when the optical navigation device 100 comprises the elastic material 301. For example, the movement detecting device 105 may be provided to the location shown in FIG. 2. In the embodiment of FIG. 4, the movement detecting device 105 and the elastic material 301 are provide to the second surface Sr_2, Also, the movement detecting device 105 is surrounded by the elastic material 301. In such case, the middle part of the elastic material 301 may be empty (shown as dotted lines) such that the movement detecting device 105 can still detect the approaching of the third surface Sr_3 (the above-mentioned target object) even surrounded by the elastic material 301.

Figure 5:
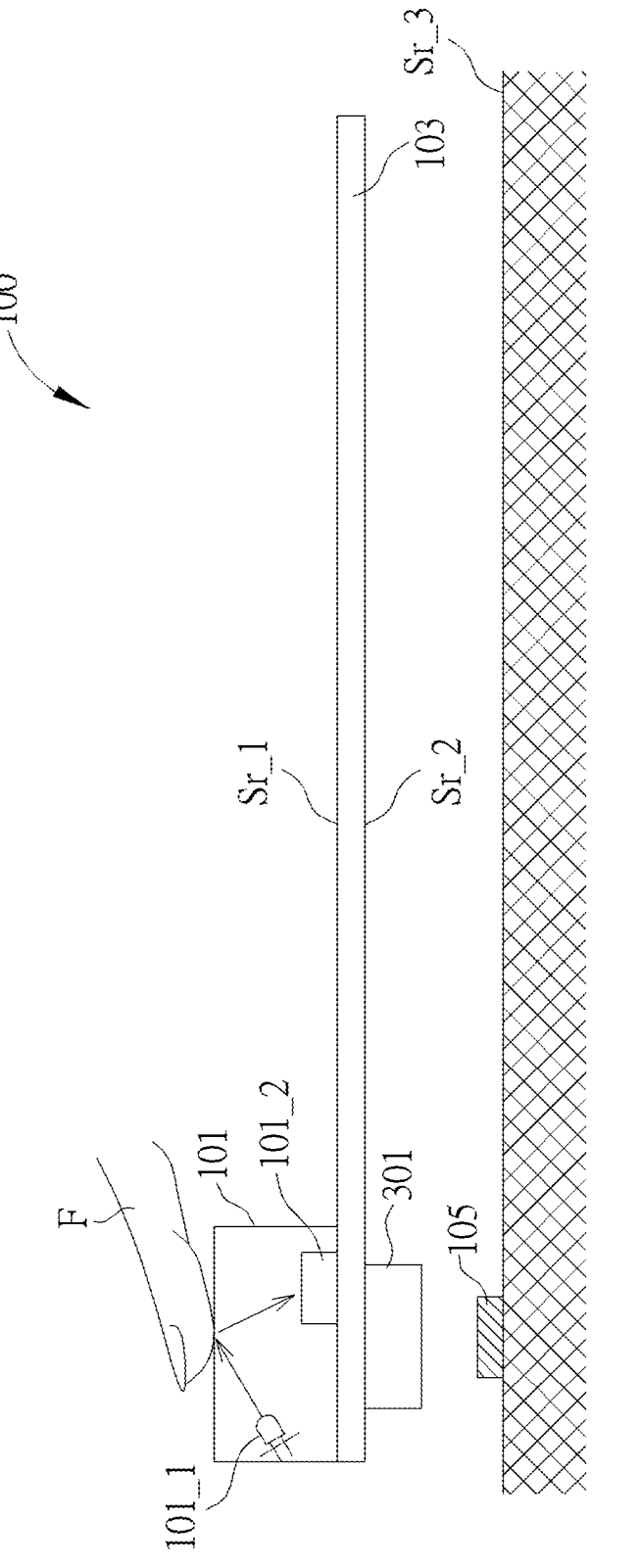
FIG. 5 is a schematic diagram illustrating an optical navigation device according to one embodiment of the present invention, in which the location of the elastic material is different from which in FIG. 3 and FIG. 4.
Figure 6:
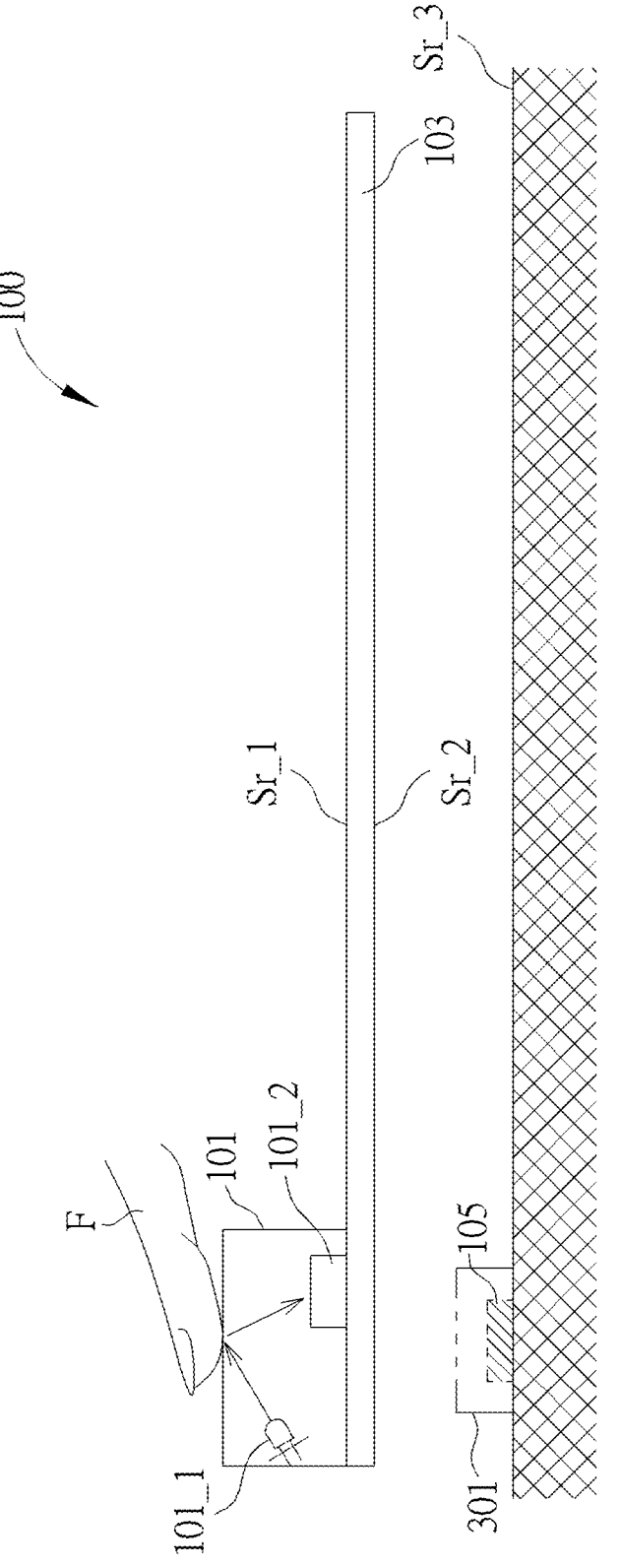
FIG. 6 is a schematic diagram illustrating an optical navigation device according to one embodiment of the present invention, in which the movement detecting device is surrounded by the elastic material but the location of the movement detecting device is different form which in FIG. 4.

In the embodiment of FIG. 5, the elastic material 301 is provided to the second surface Sr_2. Also, the movement detecting device 105 is provided between the elastic material 301 and the third surface Sr_3, such that the movement detecting device 105 can still detect the approaching of the elastic material 301 (the above-mentioned target object) to detect the movement of the optical touch sensor 101. In the embodiment of FIG. 6, the movement detecting device 105 and the elastic material 301 are provided to the third surface Sr_3, and the movement detecting device 105 is surrounded by the elastic material 301. In such case, the middle part of the elastic material 301 may be empty such that the movement detecting device 105 can still detect the approaching of the second surface Sr_2 (the above-mentioned target object) even surrounded by the elastic material 301.

Please note, the location of the movement detecting device 105 is not limited to the above-mentioned examples. The location of the movement detecting device 105 can be changed corresponding to different designs of the optical touch sensor 101, the circuit board 103 or the movement detecting device 105. Additionally, in above-mentioned embodiments, the optical navigation device 100 comprises only one optical touch sensor 101 and only one circuit board 103. However, the optical navigation device can comprises any number of optical touch sensor and any other number of circuit board.

Figure 7:
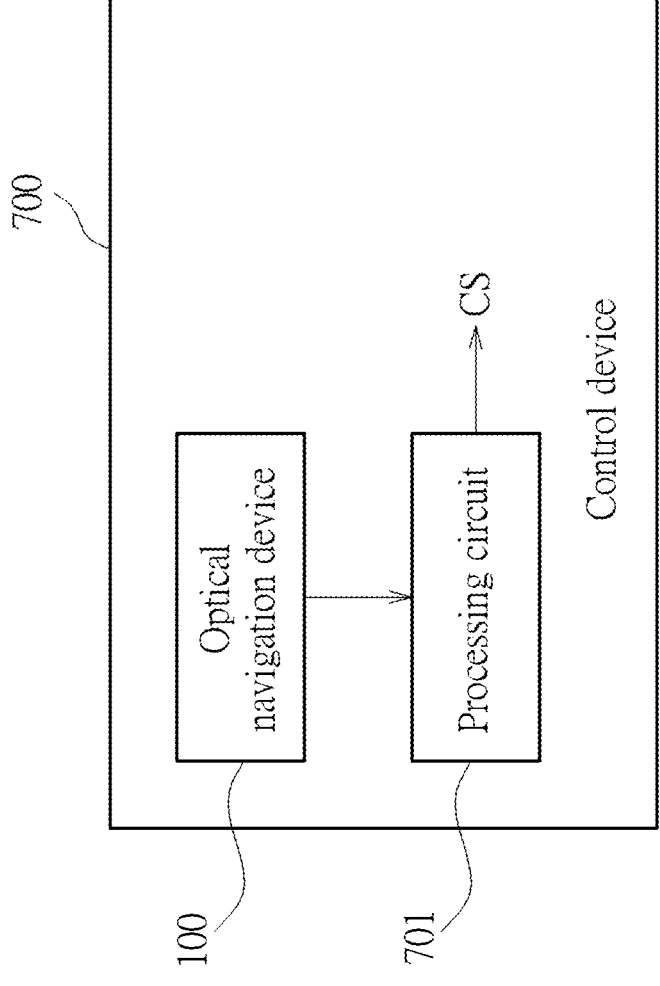
FIG. 7 is a block diagram illustrating a control device using the optical navigation device illustrated in FIG. 1-FIG. 6, according to one embodiment of the present invention.

FIG. 7 is a block diagram illustrating a control device using the optical navigation device illustrated in FIG. 1-FIG. 6, according to one embodiment of the present invention. As illustrated in FIG. 7, the control device comprises the above-mentioned optical navigation device 100 and a processing circuit 701. The optical navigation device 100 may comprise the structures shown in FIG. 1-FIG. 6. As illustrated above, the optical touch sensor 101 may generate a touch sensing result which indicates whether the optical touch sensor 101 is touched or not. Also, the movement detecting device 103 is configured to detect a movement of the optical touch sensor 101. The processing circuit 701 generates a control signal CS according to the touch sensing result and the movement. The processing circuit 701 may be any circuit which have computational functions such as a MCU (Micro Control Unit) or a CPU (Central Processing Unit).

Specifically, in one embodiment, the processing circuit 701 does not generate the control signal CS or generates the control signal CS which controls a target function to be non-activated, if the touch sensing result indicates the optical touch sensor 101 is touched but the movement is below a movement threshold. Such situation may occur, for example, the user lightly brushes against the optical navigation device while walking, or a certain part of the body is close to the optical navigation device.

On the opposite, the processing circuit 701 generates the control signal CS which controls the target function to be activated if the touch sensing result indicates the optical touch sensor 101 is touched and the movement is above the movement threshold. Such situation may mean that the user really wants to perform a touch control action to the control device 700, thus touches and provides a force to the optical navigation device 100.

The control device 700 may be applied to control various functions of various devices. For example, if the control device 700 is applied to a vehicle, the target function may mean a function which the vehicle can provide, such as speed up, slow down, honk or open the window. For another example, if the control device 700 is applied to an elevator, the target function may mean up or down of the elevator. Please note the control provided by the present application is not limited to these examples.

In view of above-mentioned embodiment, the false triggering of the optical navigation device may be avoided, thereby the control device using the optical navigation device may be more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
a circuit board;
an optical touch sensor, provided to the circuit board; and
a movement detecting device, configured to detect a movement of the optical touch sensor;
wherein the optical touch sensor is provided to a first surface of the circuit board and the movement detecting device is provided to a second surface of the circuit board or inside the circuit board or provided to a third surface opposite to the second surface;
wherein the second surface is opposite to the first surface.

2. The optical navigation device of claim 1, further comprising:
elastic material, provided between the second surface and the third surface.

3. The optical navigation device of claim 2, wherein the movement detecting device is surrounded by the elastic material.

4. The optical navigation device of claim 2, wherein the movement detecting device is located between the elastic material and the second surface, or located between the elastic material and the third surface.

5. The optical navigation device of claim 1, wherein the movement detecting device is a proximity sensor.

6. The optical navigation device of claim 1, wherein the circuit board is a FPC.

7. A control device, comprising:
a processing circuit; and
an optical navigation device, comprising:
a circuit board;
an optical touch sensor, provided to the circuit board, configured to generate a touch sensing result; and
a movement detecting device, configured to detect a movement of the optical touch sensor;

wherein the processing circuit generates a control signal according to the touch sensing result and the movement;
wherein the optical touch sensor is provided to a first surface of the circuit board and the movement detecting device is provided to a second surface of the circuit board or inside the circuit board or provided to a third surface opposite to the second surface;
wherein the second surface is opposite to the first surface.

8. The control device of claim 7, further comprising:
elastic material, provided between the second surface and the third surface.

9. The control device of claim 8, wherein the movement detecting device is surrounded by the elastic material.

10. The control device of claim 8, wherein the movement detecting device is located between the elastic material and the second surface, or located between the elastic material and the third surface.

11. The control device of claim 7, wherein the movement detecting device is a proximity sensor.

12. The control device of claim 7, wherein the circuit board is a FPC.

13. The control device of claim 7,
wherein the processing circuit does not generate the control signal or generates the control signal which controls a target function to be non-activated, if the touch sensing result indicates the optical touch sensor is touched but the movement is below a movement threshold;
wherein the processing circuit generates the control signal which controls the target function to be activated if the touch sensing result indicates the optical touch sensor is touched and the movement is above the movement threshold.

14. An optical navigation device, comprising:
a circuit board;
an optical touch sensor, provided to the circuit board; and
a proximity sensor, configured to detect an approaching of a target object, wherein the approaching is for determining whether the optical navigation is really touched;
wherein the optical touch sensor is provided to a first surface of the circuit board and the proximity sensor is provided to a second surface of the circuit board or inside the circuit board or provided to a third surface opposite to the second surface;
wherein the second surface is opposite to the first surface.

15. The optical navigation device of claim 14, further comprising:
elastic material, provided between the second surface and the third surface.

16. The optical navigation device of claim 15, wherein the proximity sensor is surrounded by the elastic material.

17. The optical navigation device of claim 15, wherein the proximity sensor is located between the elastic material and the second surface, or located between the elastic material and the third surface.

18. A control device, comprising:
a processing circuit; and
an optical navigation device, comprising:
a circuit board;
an optical touch sensor, provided to the circuit board, configured to generate a touch sensing result; and
a movement detecting device, configured to detect a movement of the optical touch sensor;
wherein the processing circuit generates a control signal according to the touch sensing result and the movement;

wherein the processing circuit does not generate the control signal or generates the control signal which controls a target function to be non-activated, if the touch sensing result indicates the optical touch sensor is touched but the movement is below a movement threshold;

wherein the processing circuit generates the control signal which controls the target function to be activated if the touch sensing result indicates the optical touch sensor is touched and the movement is above the movement threshold.

*     *     *     *     *